United States Patent [19]

Stead et al.

[11] 4,218,492

[45] * Aug. 19, 1980

[54] BACON PROCESSED PRODUCT

[75] Inventors: Emmett T. Stead, LaGrange, Ill.; Ray A. Kennedy, Sioux City, Iowa

[73] Assignee: Micromatic, Inc., Sioux City, Iowa

[*] Notice: The portion of the term of this patent subsequent to Dec. 14, 1993, has been disclaimed.

[21] Appl. No.: 936,195

[22] Filed: Aug. 24, 1978

Related U.S. Application Data

[63] Continuation-in-part of Ser. No. 918,583, Jun. 23, 1978, abandoned, which is a continuation of Ser. No. 748,329, Dec. 7, 1976, abandoned, which is a continuation-in-part of Ser. No. 608,338, Aug. 27, 1975, Pat. No. 3,997,672, which is a continuation-in-part of Ser. No. 545,801, Jan. 1, 1975, abandoned, which is a continuation of Ser. No. 403,315, Oct. 3, 1973, abandoned, which is a continuation-in-part of Ser. No. 208,892, Dec. 16, 1971, abandoned.

[51] Int. Cl.$^2$ .............................................. A22C 11/00
[52] U.S. Cl. ..................................... 426/646; 426/59; 426/513; 426/524; 426/658
[58] Field of Search ................... 426/56, 59, 264, 269, 426/262, 638, 513, 516, 519, 645, 646, 657, 658, 524

[56] References Cited

U.S. PATENT DOCUMENTS

| | | | |
|---|---|---|---|
| 2,907,661 | 10/1959 | Niven et al. | 426/59 |
| 3,399,065 | 8/1968 | Wistreich et al. | 426/42 |
| 3,642,496 | 2/1972 | Gibson | 426/513 |
| 3,652,296 | 3/1972 | Wilkerson et al. | 426/264 X |
| 3,851,078 | 11/1974 | Khayat et al. | 426/268 |
| 3,997,672 | 12/1976 | Stead et al. | 426/59 |

*Primary Examiner*—R. B. Penland
*Attorney, Agent, or Firm*—Robert W. Carlson

[57] ABSTRACT

A meat product free of nitrite, nitrates, vegetable matter, or any similar preservative or filler matter is produced by grinding small pieces of pork belly to form an emulsion and adding a cure mixture; curing the resultant emulsion for a predetermined period on the order of not less than ½ hour or more than 6 hours and thereafter placing the cured emulsion into molds and slowly cooking the product at varying temperatures. The molded product is thereafter chilled to approximately the freeze point of distilled water, i.e., 28° to 30° F. The bacon product may be formed solely of natural ingredients and natural sweetners to eliminate a sugar normally employed in the processed product. If desired, the bacon product may be molded and marketed without cooking.

11 Claims, No Drawings

BACON PROCESSED PRODUCT

This invention relates to the meat product derived from a novel process for the preparation of food, notably meat products. More particularly, it relates to an edible bacon flavored product derived from pork and also certain processed beef products having a strong resemblance in taste and bite to the usual and presently marketed so called natural products to which the process products relate. This application is a continuation-in-part of our prior application Ser. No. 918,583 filed June 23, 1978 now abandoned which was a continuation of Ser. No. 748,329 filed Dec. 7, 1976 now abandoned which was a continuation-in-part of application Ser. No. 608,338 filed Aug. 27, 1975, now U.S. Pat. No. 3,997,672 which was a continuation-in-part application of our application Ser. No. 545,801, filed Jan. 1, 1975, now abandoned, which in turn was a continuation of Ser. No. 403,315 filed Oct. 3, 1973, entitled BACON PROCESSED PRODUCT, now abandoned; the latter being a continuation-in-part of Ser. No. 208,892, filed Dec. 16, 1971, entitled BACON PROCESSED PRODUCT, also abandoned.

BACKGROUND OF THE INVENTION

There are several problems encountered in a production of bacon as presently available on the market either in slab form or more conventionally packaged in the form so generally recognized by the public. By way of example, pork bacon is a product made from the select portions of the belly area of a hog. These belly areas are primarily those carcass areas where the movement of the hog causes flexure which produces a muscular fat structure that is different from other fatty areas of the animal. Due to this muscular development, the fat takes on a particular character when cooked, having a distinctive type flavor and a distinctive type bite which is well recognized by butchers and the general public as bacon. Additionally, there are at least three different muscular and fat to meat ratios in the so called bacon type pork belly which produce different flavors and bites when cooked in the usual manner by the consumer. It is, therefore, very difficult for the meat processors to produce uniform bacon type and flavored products even though every portion of the selected belly areas are processed in the precisely same manner.

A further problem arising from the conventional method of producing bacon is caused by the accumulation of nitrites and nitrates in the final consumer product. When the bacon is cured in the conventional manner as practiced universally today, the cure mixture includes some form of nitrites and nitrates in small amounts. This additive is well known for its property of causing red meat to turn a bright red color and to keep the color for relative long periods to enhance the marketability of the product over relatively long time spans since the buying public has been indoctrinated to the fallacy that only bright red meat is edible and unspoiled premium product. The nitrites, in a solution, are pumped into the belly with hollow needles which more often than not cause the internal parts of the belly meat to expand creating voids, resulting in numerous internal accumulations of curing solution in these voids which are, in the trade, referred to as "pickle pockets". These pockets cannot be readily removed and therefore become an integrated part of the treated belly.

After the pumping process, the belly is placed in a vat or other suitable container containing a water soluble cure solution. As is well known in the meat processing art, the fatty portions of the belly repel the water soluble cure solution, but the meat areas which are porous accept the cure solution. The result of this absorption of cure solution is that the nitrates and nitrites may, and often do, collect in dangerous quantities in the red meat during the curing step and if the accumulations are extensive, consumption of such meat containing the concentrated accumulations may be detrimental to the health of the consumer as will be pointed out. An added problem results from the fact that the pickle pockets do not slice evenly when the pork belly is later sliced and these slices are put into bacon ends and pieces that are added to the usual commercial package beneath the usual exposed attractive slices or are packaged and sold as bits and pieces which must be marketed at a lower price.

As pointed out, the use of nitrites and nitrates in bacon cure has been discovered to pose a potential health hazard to humans. Many recent studies have discovered that the formation of carcinogenic nitrosamines is caused by the reactions between various nitrites and nitrates in secondary amines. Numerous experiments have shown that nitrosamines can be stored in the stomach in quantities such as to induce the growth of tumors. Reference is made to the following reports which substantiate the above statement as to the potential hazard of nitrites and nitrates in processed meat, it being understood that by no means are these isolated reports made on this subject, to wit, being exemplary only.

"The Role of Lean and Aclipose Tissue on the Formation of Nitrosophyrrolidine in Fried Bacon" 1070- Journal of Food Science-Volume 22, No. 6, Page 1026, Nov./Dec., 1974.

"Nitrosamines Studies: Neoplasms of Liver and Genital Mesothelium in Nitrosopyrrolidine Treated MRC Rats" Journal of National Cancer Institute, Vol. 48, pages 1687-1969, 1972.

Thus, it can be stated that potential hazard of ingesting nitrosamines has been recognized by the Government and limitations of use of sodium nitrite are placed on plants operating under federal inspection by the meat inspection division of the USDA. According to these regulations, sodium nitrite should not exceed 200 parts per million in the product after curing and processing. With the product of the subject invention, no problem is encountered in meeting such standards since the nitrite is not used in the cure. As stated above, the present invention produces a "red meat" appearance without the addition of nitrite.

In addition to the process by which commercial bacon is produced, there have been attempts to produce a "bacon" substitute. A prime example of such a substitute is exemplified in U.S. Pat. No. 3,642,496 which discloses a method of forming a bacon substitute product utilizing bacon ends. In this process, bacon ends are frozen and then chipped in a meat chipper to produce pieces of bacon approximately ¼ inch in thickness and weighing from 6 to 8 ounces per chip. A meat addition, consisting of a portion of the animal with a high gelatin protein content such as cured ham shanks is ground in a conventional manner. The frozen chipped bacon ends and meat addition are then placed in the grinder and ground together. After grinding, egg white is added to act as a binder in the resulting mixture.

As is obvious, the product produced by the following teachings of this patent can by no means be characterized as "bacon".

THE INVENTION

The above noted problems have been overcome by the process of the present invention which results in a meat product which tastes very similar to bacon and has substantially the same texture when it is being eaten and which is totally void of health endangering color or tissue preservatives. Therefore, it is an object of this invention to form a good product which utilizes only the pork belly including relatively small particles of all sizes and shapes of pork belly meat including those pieces which are usually discarded in ordinary bacon production.

Another object of this invention is to provide a bacon flavored product which may be fully cooked when purchased and results in very little shrinkage when heated prior to consumption.

A further object of the invention is to provide a processed bacon product which has a bright red meat appearance and which is completey void of nitrite, nitrates or vegetable matter.

A still further object of the invention is to provide a bacon product without the use of sugar.

An additional object of the invention is to produce a bacon product which has an appearance quite different from sliced bacon since there is no separation between the fat and lean areas, yet the product is visually attractive, crispy to the bite, as is bacon and gives off the odor of bacon when being cooked or heated depending on the process steps by which it is produced.

A further object is to provide a processed bacon product according to the present invention which may be packaged and marketed prior to cooking if so desired or it may be pre-cooked so that the consumer only needs to warm the product if desired prior to consumption.

Finally, an important aspect of the invention is that the bacon product formed in accordance with this invention does not utilize components that are not found in regular bacon and thus may be identified as a true bacon product as contrasted with many processed bacon products presently on the market that may not be labeled as bacon or bacon imitations since such products include meat additions or other substances which are not found in pork belly from which conventional bacon is produced. These and other objects not specifically eluded to herein, but inherent in the inventive concept disclosed will become readily apparent to those skilled in the art from consideration of the following description of the product produced and they are within the spirit and scope of the following detailed specifics of the product producing process.

In broad aspects the novel product is produced from a process which involves the steps of grinding the started ingredients which consists entirely of pieces of pork belly, into a very fine emulsion, either after curing or with concurrent addition of the curing mixture. By emulsion, it is meant a moist cohesive mass. The meat and fat are so intermixed that the natural gelatin contained in the fat acts as a binder and prevents the product, when molded into a desired shape, from falling apart even though the product has not been cooked. It has been found that an ideal product may be formed in this manner when a meat to fat ratio is within the range of 55% to 75% of meat, the remainder constitutes fat. However, satisfactory results have been obtained when the meat to fat ratio is within the range of 30% to 90% of meat, the remainder constitutes fat.

No additive is necessary to hold the formed product in a desired shape as in the conventional methods. The raw process product has an appearance of bright red meat inasmuch as the fat and meat are so finely intermixed. The fat of the pork belly gives the resulting raw product a somewhat "mottled" appearance without taking away the red meat look which enhances its market-ability. There is no need to add a substance to redden the meat as is the present practice in bacon.

The resulting emulsion is then placed into molds and thereafter chilled, ideally the temperature is lowered between 28° F. and 30° F. The formed product may then be packaged and marketed in the same manner as conventional sliced bacon, being identified as an uncooked product requiring cooking before consumption by the consumer. The process may be carried a step further and cooked after molding as specified in the following examples and thereafter packaged as a cooked, heat only type of consumer product.

The product of this invention may readily be cooked by use of high frequency such as utilized in "radar" ovens. This is due to the reconstituted nature of the meat which results in uniform penetration of the high frequencies throughout the product.

The following are specific examples of curing ingredients and procedural steps for producing the processed bacon product of the present invention.

EXAMPLE I

A cure mixture having the following information of ingredients was prepared:

|  | Range |
| --- | --- |
| Pepsin | 1.0%–2.0% |
| Salt | 79.0%–81% |
| Sugar | 20.00%–17.0% |

This mixture was added to water in the proportion of 4 pounds of mixture to every 5 gallons of water to form a cure solution. To this solution, 10 teaspoons of liquid smoke, a commercial brand labeled Griffith Natural Smoke Flavor, S.F.-18 neutralized, were added. The solution is agitated until all ingredients are completely dissolved in solution. The curing solution was used to cure 100 pounds of fresh pork belly meat in the following manner.

First, between 2% to 5% of lean red meat was trimmed from the 100 pounds of meat and fat and ground to form an emulsion having the characteristic of moistness and cohesion. Next, the remaining meat was sliced into strips 2 to 6 inches in width approximately 1/16 to ¼ inches in thickness to promote absorption and placed into vats together with sufficient cure solution so that all strips of meat were completely submerged therein. The strips of meat were left in the cure solution for approximately 2 hours and maintained at a temperature of between 40° F. and 50° F. At this point it should be noted that the strip meat must be left in the cure solution for at least 1 hour and not over 6 hours to affect a proper cure and assure the desired taste and cooking characteristics of the marketed product.

When the strips of meat were removed from the curing solution they are allowed to stand and the excess solution to drain after which they were cut into small pieces and fed into grinding apparatus. A suitable grinding apparatus known is the Griffins Mince Master, a stock item. The lean red meat previously ground into an emulsion is fed into the grinding apparatus in small amounts substantially at a rate proportionate to the percentage trimmed from the original 100 pounds. For example, if 2% of lean red meat were trimmed, then 1 pound of the lean meat emulsion would be metered into the grinding apparatus for every 49 pounds of cured pieces. If 5% of lean red meat were trimmed, then 1 pound of the lean meat emulsion would be metered into the grinding apparatus for every 19 pounds of cured pieces. More simply stated, the rate of addition of uncured lean meat to cured meat is directly proportioned to the percentage amount of lean meat removed from the total weight of the pork belly piece including fat and lean content.

In this instance, the resulting emulsion was then placed into molds and cooked slowly by placing the molds into an oven at a temperature of 78° F. The oven temperature was raised in spaced increments a few degrees at a time over a four-hour period until the temperature of 128° F. was reached and held stable. Thereafter, the temperature was slowly increased by a few degrees in spaced increments until the temperature reached 151° F. over a period of 2 hours.

The product was thereafter removed from the oven and chilled in the molds to just below the freezing point of distilled water or to a temperature of about 28° F. to 30° F. The formed products were then removed from the molds and packaged and kept refrigerated at a conventional temperature somewhat less than 50° F. and displayed excellent shelf life over a considerably longer time span than that of conventionally marketed bacon, similarly stored.

EXAMPLE II

As an alternative to the Example I process, a dry cure mixture having the formation of Example I was prepared. Ten teaspoons of the liquid smoke were added to the dry cure mixture. One hundred pounds of fresh pork belly meat was cut into small pieces and fed into the grinding apparatus with the dry cure mixture being metered into the grinding at a rate of 0.04 pounds per pound of meat. The meat was maintained at a temperature of between 40° F. and 50° F. during the grinding operation. The resulting emulsion was thereafter cooked and chilled in the same manner as Example I.

Again, there was produced a fully cooked and cured bacon-like product which has a longer shelf life than the usual bacon product.

Aside from being devoid of nitrites and nitrates and possessing better shelf life than bacon, as presently marketed, the products whether produced by the process of Example I or II exhibit the advantage of remarkable lack of shrinkage when heated for use by the consumer. For example, conventional sliced bacon loses between 60–65% of the fat content when cooking which results in as much as 50% shrinkage in the fully cooked product. In contrast, the present product, during its slow graduated period of cooking loses only 5–6% of the fat so there is virtually no shrinkage when the product is subsequently heated for consumption. This is due to the fact that when the meat is emulsified, the fat becomes so intermixed with the red meat portions that little of it is lost when cooking. Additionally, the natural gelatin retained in the emulsified meat acts as a binder to prevent the product from crumbling apart when cooked.

EXAMPLE III

The process of the subject invention may also be utilized to make a product having the taste and cooking characteristics of the meat product commonly called "Canadian" bacon. In this instance, instead of using pork belly, the meat processed would be in the pork loin. The loin meat is processed in precisely the same manner utilizing the same cure mixture as set forth in Examples I and II.

EXAMPLE IV

Processed ham cure may also be formed with the disclosed subject process. In this embodiment, the hind quarter of the hog is processed the same as the products described above utilizing either the same dry cure mixture of Example II or the wet mixture of Example I for the pork quarter as for the pork belly.

EXAMPLE V

A further embodiment of the invention comprises the formation of the meat, bacon, ham or whatever, into any desired shape by use of an extruder. In this embodiment, the entire pork belly is chopped or coarsely ground into pieces up to ¼ inch in size. A portion of this ground meat is mixed with curing ingredients in accordance with Example I both as to portions of meat to cure and the curing ingredients. The cured portion together with the remaining portion is then emulsified and thereafter extruded into desired shape. The shape may be varied with using dies having different shaped orifices.

Also, in practicing this embodiment of the process, the meat may be extruded into casings such as used in forming conventional link sausage. The following is a specific example of ingredients and procedural steps utilized in accordance with this embodiment.

EXAMPLE VI

A cure mixture having the following formulation of ingredients was prepared:

|  | Range |
| --- | --- |
| Pepsin | 1.0%–2.0% |
| Salt | 79.0%–81% |
| Sugar | 20.00%–17.0% |

This mixture was added to water in the proportion of 4 pounds of mixture to every 5 gallons of water to form a cure solution. To this solution, 10 teaspoons of liquid smoke the commercial brand labeled Griffith Natural Smoke Flavor, S.F.-18 neutralized as identified above, were added.

A hundred pounds of meat was prepared by chopping or coarsely grinding pork bellies into pieces up to one quarter (¼) inch in size. A portion of this meat, 5% of five (5) pounds were submerged in the cure solution for one half hour maintained at a temperature of between 40° F. to 50° F. and emulsified in suitable apparatus such as Griffiths "Mince Master". The mixture maintained at a temperature of between 40° F. to 50° F. during the emulsifying operation which was continuous for a period of between one half hour to one hour. The emulsion was then mixed with the remainder of the meat for approximately five minutes at a temperature of between 40° F. to 50° F. in suitable apparatus such as Griffiths "Mixer". This mixture was then extruded into desired shape utilizing a "Vemag Continuous Stuffer".

In one instance, the resulting emulsion was thereafter cooked and chilled in the same manner as Example I. In a further instance, the resulting emulsion was chilled and packaged in the same manner as Example I.

EXAMPLE VII

A further embodiment comprises the formation of meat as in Example VI with a cure mixture comprised of:

|  | Range |
| --- | --- |
| Pepsin | 1.0%-2.0% |
| Salt | 79.0%-81% |
| Honey | 20.00%-17% |

In this embodiment, the honey in the cure mixture results in a pleasant and novel tasting meat product. In addition, many people in recent years have turned to foods having basically only natural occuring ingredients. The substitution of honey in lieu of sugar is most appealing in this group of people.

The preparation of bacon product of this invention produces a definite economic advantage for the pork processor. The pork belly area of the hog comprises much greater and heavier meat content overall than is present in the regular bacon style belly.

Bacon is presently produced by automated machinery. The pork belly must be cut and trimmed so that it can be handled by the machinery. In doing so, much of the meat content is lost. For example, the entire pork belly comprises on an average of 75% meat and 25% fat. The trimmed pork belly presently used in making bacon includes only 25% to 35% meat, the remainder being fat.

According to the present invention, the entire pork belly area is utilized with the resultant product containing between 55% to 75% meat and the remainder being fat. It is quite obvious that enconomics are affected by utilizing the entire pork belly as well as the process results in a meat product which is more desirous to the consumer as completely free of substances adverse to health.

EXAMPLE VIII

The subject process is not limited to the production of pork products but can also be used in producing processed corned beef. In this embodiment, the brisket of the beef is processed in the same manner as the pork described above. The cure mixture however, is different comprising the following:
10 lbs. water
4½ lbs. table salt
3 lbs. sugar
1½ lbs. of coarse picked ground pure salt
2 1.2 lbs. of cream of tartar The cure is incorporated into the meat in wet form and the process is carried out as set forth in Example I.

EXAMPLE IX

A still further embodiment of the invention involves the use of a nitrite, nitrate free cure comprised of salt, hydrolized milk, natural smoke flavor, spices, cysteine hydrochloride, thiamine hydrochloride, and silicon dioxide added as an anticaking agent.

The cure mixture was prepared according to the following formulation of ingredients:

|  | Range |
| --- | --- |
| Salt | 89.00%-92.00% |
| Hydrolized Milk | 8.00%-6.60% |
| Spices | .70%-.50% |
| Cysteine Hydrochloride | .40%-.20% |
| Thiamine Hydrochloride | .40%-.20% |
| Silicon Dioxide | 1.50%-.50% |

A pint of liquid smoke, a commercial brand labeled Griffith Natural Smoke Flavor, S.F.-18 neutralized, was added to 100 pounds of the cure mixture. The spices may be either French Savory or Rosemary or a mixture of both.

One hundred pounds of pork belly was processed in the following manner. The pork belly was ground in Griffins Mince Master utilizing a ⅛" extruding die. Three and one half pounds of the cure mixture, prepared in the manner set forth above, was mixed with two gallons of water and three fourths pound of honey.

The ground pork belly and the mixture of water, cure mixture and honey was placed into a blender and thoroughly mixed. During the mixing, three and one half pounds of calcium reduced skim milk was added into the blender.

Approximately 25% of the blended mixture was then run through an emulsifier and put back into the blender with the remaining 75% and mixed therewith.

The resultant product was then stuffed into clear casings and placed in a smoke house until the internal temperature of the meat reached 152° F. The formed products were then packaged and kept at a conventional temperature somewhat less than 50° F.

Instead of stuffing the product into casings, it could be molded and cooked in the same manner as in Example I.

Having described the process for preparing meat products in detail, it will be apparent that changes and modifications will occur to those skilled in the art and all of which may fall within the spirit and scope of the appended claims wherein;

What is claimed is:

1. A processed bacon product having a bright red meat appearance containing no salts of nitrite and nitrate and no vegetable matter formed by the method comprising the steps of chopping fresh pork meat into small pieces, feeding are of said pieces together with a bacon cure mixture comprised of pepsin 1.0%-2.0%, salt 79.0%-81% and sugar 20.00%-17% at a ratio of about 0.04 pounds of cure per pound of meat into grinding apparatus while grinding said pieces into a homogeneous mass at a temperature of between 40° F. and 50° F. said cure being effected while the meat is in contact with said cure mixture during said grinding, molding said product into a desired shape without the addition of a vegetable binder and chilling to a temperature sufficient to cause the product to maintain its homogeneous molded shape.

2. A processed meat product having a bright red meat appearance containing no salts of nitrite and nitrate, and no vegetable matter formed by the method comprising the steps of chopping fresh meat into small pieces, submerging a portion of about 5% of the pieces in a cure mixture comprised of pepsin 1.0%-2.0%, salt 79.0%-81% and sugar 20.00%-17.0% for approximately one half hour at a temperature of between 40° F. to 50° F., emulsifying said portion, recombining said portion with the remaining chopped meat, mixing into a homogeneous mass, molding said product into a desired shape without the addition of a vegetable binder and chilling to a temperature sufficient to cause the product to maintain its homogeneous molded shape.

3. A processed meat product according to claim 2, wherein the meat consists solely of a pork loin.

4. A processed meat product according to claim 2, wherein the meat consists solely of a beef brisket.

5. A processed meat product according to claim 4, wherein the cure mixture comprises the following:
4½ lbs. table salt
3 lbs. brown sugar
1½ lbs. of coarse picked ground pure salt
2½ lbs. of cream of tartar.

6. A processed meat product according to claim 2, wherein the meat consists solely of the meat from the hind quarter of a hog.

7. A processed bacon product having a bright red meat appearance containing no salts of nitrite and nitrate and no vegetable matter formed by the method comprising the steps of grinding fresh pork meat, mixing a cure mixture comprised of salt 89.00%–92.00%, hydrolyzed milk 8.00%–6.60%, spices 0.70%–0.50%, cysteine hydrochloride 0.40%–0.20%, thiamine hydrochloride 0.40%–0.20%, silicon dioxide 1.50%–0.50% at a ratio of about 3½ lbs. of cure mixture to 100 lbs. of meat, emulsifying a portion of about 25% of said blended meat and cure mixture, recombining said portion with said blended meat and mixing into a homogeneous mass and thereafter extruding said product into desired shape without the addition of a vegetable binder.

8. A processed bacon product having a bright red meat appearance containing no salts of nitrite and nitrate and no vegetable matter formed by the method comprising the steps of trimming between 2% to 5% of lean red meat from a predetermined amount of fresh pork belly meat, grinding said lean meat to form an emulsion, slicing the remaining meat in thin slices and submerging said slices in a bacon cure mixture comprised of pepsin 1.0%–2.0%, salt 79.0%–81% and sugar 20.00%–17.0% for at least one hour and not over six hours at a temperature of between 40° F. and 50° F., and recombining said emulsion with the slices and grinding into a homogeneous mass.

9. A processed bacon product as set forth in claim 8 wherein said homogeneous mass is extruded into desired shape without the addition of a vegetable binder and chilling to a temperature sufficient to cause the product to maintain its homogeneous extruded shape.

10. A processed bacon product as set forth in claim 8 wherein said homogeneous mass is molded into desired shape without the addition of a vegetable binder and chilling to a temperature sufficient to cause the product to maintain its homogeneous molded shape.

11. A processed bacon product having a bright red meat appearance containing no salts of nitrite and nitrate and no vegetable matter formed by the method comprising the steps of trimming between 2% to 5% of lean red meat from a predetermined amount of fresh pork belly meat, grinding said lean meat to form an emulsion, slicing the remaining meat in thin slices and submerging said slices in a bacon cure mixture comprised of pepsin 1.0%–2.0%, salt 79.0%–81% and honey 20.00%–17% for at least one hour and not over six hours at a temperature of between 40° F. and 50° F., and recombining said emulsion with the slices and grinding into a homogeneous mass.

* * * * *